United States Patent [19]

Sato

[11] Patent Number: 4,664,413
[45] Date of Patent: May 12, 1987

[54] RELEASE SYSTEM FOR SEAT OCCUPANT IN VEHICLE

[75] Inventor: Yoshimi Sato, Yokohama, Japan

[73] Assignee: Nissan Motor Company, Limited, Yokohama, Japan

[21] Appl. No.: 783,360

[22] Filed: Oct. 3, 1985

[30] Foreign Application Priority Data

Oct. 12, 1984 [JP] Japan .................. 59-153936[U]

[51] Int. Cl.⁴ ............... B60R 22/32; B60K 28/14
[52] U.S. Cl. .................................. 280/801; 180/281
[58] Field of Search ............ 280/801, 806, 807, 802, 280/808; 180/268, 281, 289

[56] References Cited

U.S. PATENT DOCUMENTS

| 2,714,521 | 8/1955 | Graham | 180/281 |
| 2,828,151 | 3/1958 | Brotman | 180/289 |
| 3,240,510 | 3/1966 | Spouge | 280/806 |
| 3,973,786 | 8/1976 | Rogers | 280/807 |
| 4,291,897 | 9/1981 | Minami | 280/802 |
| 4,296,942 | 10/1981 | Clifford | 280/807 |

FOREIGN PATENT DOCUMENTS 2373423  8/1978  France ................... 280/801
50-39920  4/1975  Japan .

Primary Examiner—John J. Love
Assistant Examiner—Karin L. Ferriter
Attorney, Agent, or Firm—Schwartz, Jeffery, Schwaab, Mack, Blumenthal & Evans

[57] ABSTRACT

A release system for a seat occupant restrained by a seat-belt in a vehicle can be operated either inboard or outboard. The system includes a mechanism for emergency-releasing a seat-belt retractor after the seat-belt retractor has been locked, and an emergency release control for the mechanism mounted on the vehicle body and having inboard and/or outboard operating terminals. According to this system, a rescuer can operate the system from outside the vehicle to release a stunned seat occupant, e.g. after a collision involving the vehicle and can quickly rescue the seat occupant.

14 Claims, 4 Drawing Figures

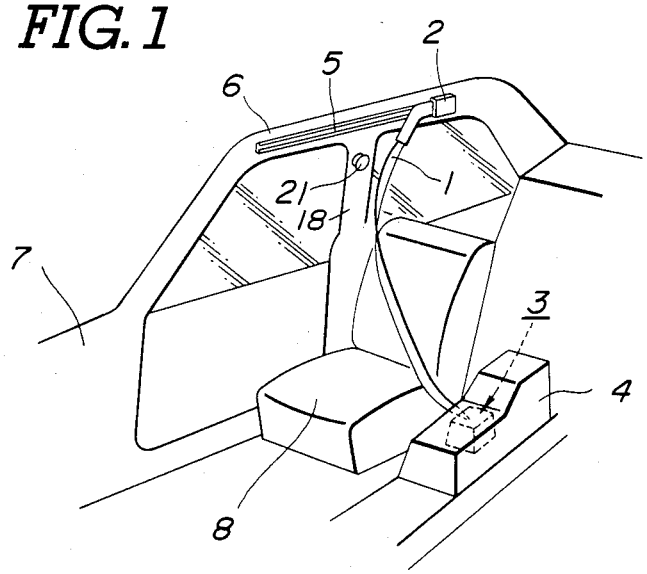
FIG. 1
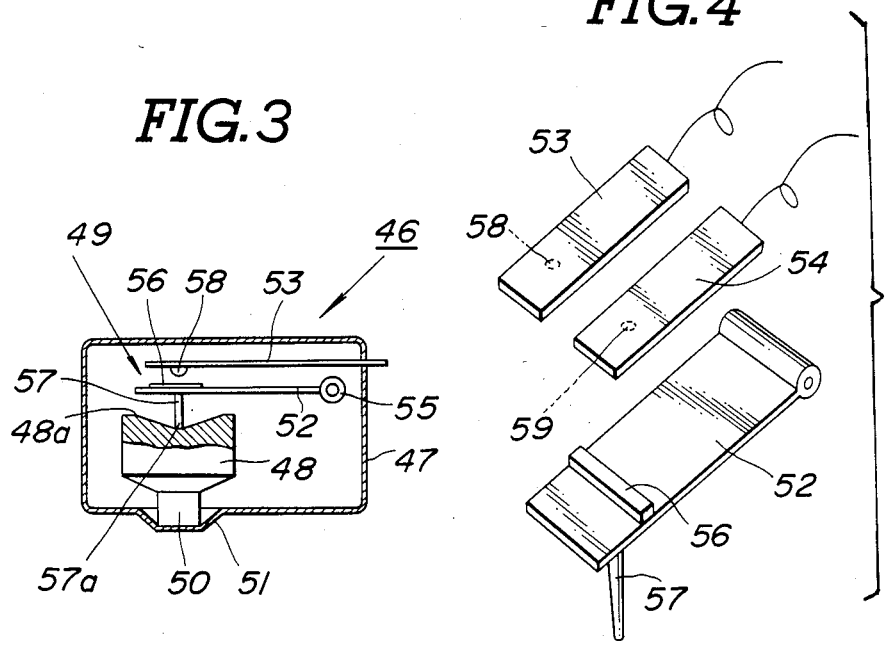
FIG. 3
FIG. 4

RELEASE SYSTEM FOR SEAT OCCUPANT IN VEHICLE

BACKGROUND OF THE INVENTION

1. Field of the Invention

This invention relates to a release system for a seat occupant restrained by a seat-belt in a vehicle and particularly to an emergency release system for a seat occupant in an automotive vehicle.

2. Description of the Prior Art

Japanese published unexamined utility model application No. 50-39920 discloses a prior art automatic seat-belt restraint and release system for an automotive vehicle. This system automatically moves one end of a lap belt combined with a shoulder belt, i.e. a webbing forward or backward along a side sill in order to release or restrain a seat occupant as a side door is opened or closed, respectively.

U.S. Pat. No. 4,291,897 discloses a prior art manual release mechanism for use with a webbing retractor built into a console box of an automotive vehicle. This release mechanism comprises a manual release linkage for a pawl which interlocks with ratchet wheels of the retractor in case of collision involving the automotive vehicle. The manual release linkage must be operated inboard by a seat occupant, who may be unconscious, in shock, or otherwise incapable of operating same.

Therefore, after the collision of the automotive vehicle, if a stunned seat occupant cannot operate the manual release mechanism by himself and release a side door lock mechanism in cases where the door is locked, rescue personnel must break the side door windowpane in order to open the side door and operate the manual release machanism or must open a back door in order to operate the manual release mechanism. This manual release mechanism makes the rescue of the shocked seat occupant inefficient and may confuse rescue personnel trying to operate it.

SUMMARY OF THE INVENTION

A primary object of this invention is to provide a release system for a seat occupant restrained by a seat-belt in a vehicle which can be operated both inboard and outboard. In order to achieve this object, the inventive system includes a seat-belt retractor having a lock locking the seat-belt retractor when a vehicle body experiences more than a predetermined degree of deceleration, a mechanism for emergency-releasing the seat-belt retractor after the seat-belt retractor is locked, and an emergency release control for the mechanism mounted on the vehicle body and having inboard and outboard operating terminals. According to this system, rescue personnel outside the vehicle can operate the system to release a stunned seat occupant, e.g. after a collision involving the vehicle and can quickly rescue the seat occupant.

Another object of this invention is to provide a release system for a seat occupant restrained by a seat-belt in a vehicle which can unlock a door, e.g. a side door of an automotive vehicle. In order to achieve this object, the inventive system, in addition to above-described system, includes means, controlled by the emergency release control, for emergency-unlocking the door.

BRIEF DESCRIPTION OF THE DRAWINGS

FIG. 1 is a perspective view showing the arrangement of a release system for a seat occupant in an automotive vehicle according to a first embodiment of this invention.

FIG. 3 is a cross-sectional view through a shock sensor of the release system of FIG. 1.

FIG. 4 is an exploded pespective view of a switch in the shock sensor of FIG. 3.

DESCRIPTION OF THE PREFERRED EMBODIMENTS

Figure 2:
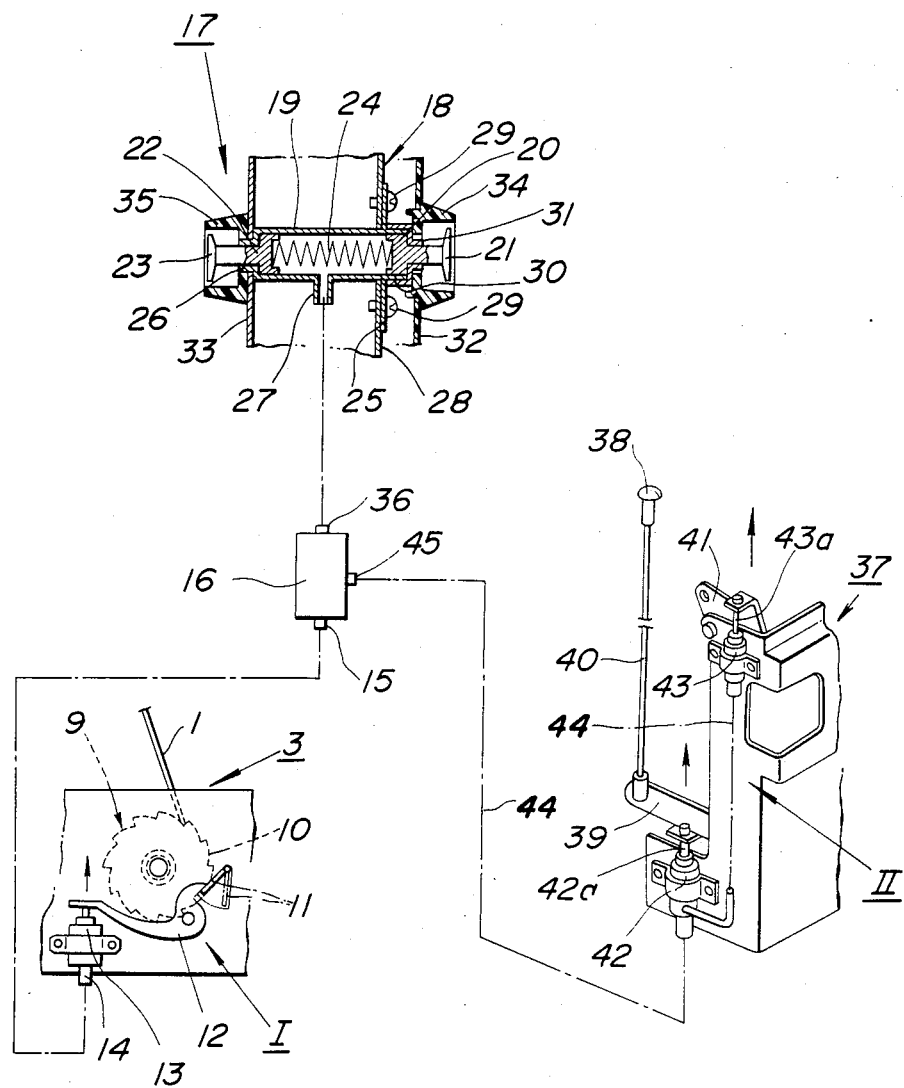
FIG. 2 is a diagram of the release system of FIG. 1.

The preferred embodiments of this invention will be described below with reference to FIGS. 1 to 4.

As shown in FIG. 1, the upper end of a webbing 1 passing diagonally over a seat 8 is attached to a movable anchor plate 2 and the lower end of the webbing 1 is wound onto a seat-belt retractor 3 in a central console box 4. The anchor plate 2 is movably mounted on a guide rail 5 extending axially along the inboard surface of a roof side rail 6. When a side door 7 is opened, the anchor plate 2 is moved forward by an electrical motor (not shown) controlled by a door switch (not shown) actuated by the side door 7 so that the webbing 1 automatically releases the occupant of a seat 8. On the other hand, when the side door 7 is closed, the anchor plate 2 is moved backward by the motor so that the webbing 1 automatically restrains the seat occupant.

As shown in FIG. 2, the retractor 3 comprises a spool 9 constantly trying to retract the webbing 1, a pair of ratchet wheels 10 mounted on opposite ends of the spool 9, a pawl 11 capable of meshing with both of the ratchet wheels 10, and a shock sensor (not shown), e.g. a pendulum for tilting the pawl 11 counterclockwise as viewed in FIG. 2, in case of abrupt deceleration, e.g. collision so as to lock the ratchet wheels 10. The spool 9 is continuously biased in the direction of retraction of the webbing 1, i.e. clockwise as viewed in FIG. 2, by the biasing force of a spring (not shown).

As shown in FIG. 2, an emergency spool-release mechanism I comprises a spool-release lever 12 for disengaging the pawl 11 from the ratchet wheels 10 and a hydraulic emergency spool-release actuator 13 for the spool-release lever 12. An input port 14 of the emergency spool-release actuator 13 is connected to a main output port 15 of a solenoid control valve 16.

An emergency release control 17 is mounted at a suitable point on the vehicle body, e.g. the top part of a hollow center pillar 18 as shown in FIG. 1 or somewhere on the side door 7. The emergency release control 17 comprises a hydraulic cylinder 19, an inboard plunger 20 with an inboard emergency release knob 21, an outboard plunger 22 with an outboard emergency release knob 23, and a set spring 24 seated between the inboard and outboard plungers 20 and 22.

The hydraulic cylinder 19 traverses the center pillar 18 and has an outwardly extending flange 25 near its inboard end. The outboard end of the hydraulic cylinder 19 terminates at a thin, outer ring 26. The intermediate portion of the hydraulic cylinder 19 has an output port 27 at a point between the inboard and outboard plungers 20 and 22 and connected to an input port 36 of the solenoid control valve 16.

The flange 25 is firmly fixed to a center pillar inner wall 28 by means of screws 29. A cylindrical cap 30 is mounted on the inboard end of the hydraulic cylinder 19. A thin ring 31 at the base of the cylinder cap 30 extends through a center pillar trim 32. The thin, outer ring 26 of the hydraulic cylinder 19 passes flush through a center pillar outer wall 33.

The inboard plunger 20 is slidably mounted within the inboard end of the hydraulic cylinder 19 and is urged inboard into contact with the cylindrical cap 30 by the set spring 24. The inboard emergency release knob 21 projects into a vehicular compartment, but is surrounded by an annular finish 34 build into the center pillar trim 32. Alternatively, the finish 34 may have a lid concealing the inboard emergency release knob 21.

The outboard plunger 22 is slidably mounted within the outboard end of the hydraulic cylinder 19 and is urged outward into contact with a shoulder formed by the thin, outer ring 26 of the hydraulic cylinder 19 by the set spring 24. A finish 35 similar to the finish 34 is mounted on the center pillar outer 33. Pushing either of the inboard or outboard emergency release knobs 21 or 23 increases the hydraulic pressure at the output port 27.

A door locking and latching mechanism 37 is built into the side door 7. As shown in FIG. 2, the door locking and latching mechanism 37 comprises an inboard door-lock knob 38, a lock lever 39 operated by the inboard door-lock knob 38 via a connecting rod 40 to lock and unlock the side door 7, and an unlatch lever 41 operated by either of door handles (not shown) on the inboard and outboard surfaces of the side door 7 to latch and unlatch the side door 7.

As shown in FIG. 2, an emergency door-release mechanism II comprises a hydraulic emergency door-unlock actuator 42 for the lock lever 39 and a hydraulic emergency door-unlatch actuator 43 for the unlatch lever 41. An actuating rod 42a of the emergency door-unlock actuator 42 is positively secured to the lock lever 39. Similarly, an actuating rod 43a of the emergency door-unlatch actuator 43 is positively secured to the unlatch lever 41.

In FIG. 2, depression of the inboard door-lock knob 38 locks the side door 7 and pulling the inboard door-lock knob 38 unlocks the side door 7. Also, clockwise movement of the unlatch lever 41 latches the side door 7 and counter-clockwise movement of the unlatch lever 41 unlatches the side door 7. Both the emergency door-unlock actuator 42 and the emergency door-unlatch actuator 43 are connected to a branched hydraulic passage 44 which is in turn connected to a branched output port 45 of the solenoid control valve 16.

This solenoid control valve 16 is a hydraulic three-way valve controlled by a shock sensor 46 capable of sensing collision of the vehicle. It continuously connects its input port 36 to its main output port 15. However, it normally shuts off communication between the branched output port 45 and the input port 36 as well as the main output port 15. On the other hand, the branched output port 45 is connected to the input port 36 and the main output port 15 when the shock sensor 46 senses abrupt deceleration, e.g. collision.

As shown in FIG. 3, the shock sensor 46, which is mounted at a suitable point on the vehicle body, comprises a casing 47, a shock-sensing weight 48 within the casing 47, and a switch 49 actuated by the shock-sensing weight 48. This shock-sensing weight 48 has a leg 50 projecting downwards and pivotably journalled within a bearing 51 in the floor of the casing 47. The upper surface of the shock-sensing weight 48 has a groove 48a with a V-shaped section extending perpendicular to the surface of FIG. 3. The shock-sensing weight 48 swings forward, i.e. to the left as viewed in FIG. 3 in response to more than a predetermined degree of deceleration exerted on the vehicle body. The switch 49 comprises a pivotable plate-like connector 52 and a pair of fixed plate-like terminals 53 and 54. One pivotable end 55 of the connector 52 is supported by the casing 47. A plate-like movable contact 56 crosses the upper surface of the connector 52 near its free end. The underside of the connector 52 has a support leg 57 projecting downwards. The lower end 57a of the support leg 57 lies in contact with the surface of the groove 48a.

The terminals 53 and 54 each have fixed contacts 58 and 59 which may move into and out of contact with the movable contact 56.

During normal travel of the automotive vehicle, the shock-sensing weight 48 and the support leg 57 are in the upright position shown in FIG. 3 and thus hold the movable contact 56 away from the fixed contacts 58 and 59. In case of collision involving the automotive vehicle, the shock-sensing weight 48 tilts forward and the support leg 57 tilts backward, so that the movable contact 56 moves upwards and touches the fixed contacts 58 and 59.

Alternatively, in place of the shock sensor 46, the switch 49 alone may be used in cooperation with the pendulum for locking the pawl 11 in case of emergency.

The operation of the inventive release system for a seat occupant in a vehicle will be described below.

When the automotive vehicle is moving normally or is at rest, the pawl 11 is out of engagement with the ratchet wheels 10 and the branched hydraulic passage 44 is inoperative. Therefore, pushing the inboard or outboard emergency release knobs 21 or 23 will not enable the emergency door-unlock actuator 42 and emergency door-unlatch actuator 43.

In case of collision with another automotive vehicle, the pawl 11 is forced into engagement with the ratchet wheels 10 by the pendulum so as to lock the spool 9, and the shock sensor 46 enables the branched hydraulic passage 44. Therefore, when a seat occupant pushes the inboard emergency release knob 21 by himself, the emergency spool-release actuator 13 removes the pawl 11 from the ratchet wheels 10 by means of the spool-release lever 12, and the emergency door-unlock actuator 42 and the emergency door-unlatch actuator 43 hold the side door 7 in an openable position by means of the respective lock lever 39 and unlatch lever 41.

On the other hand, when a stunned seat occupant cannot push the inboard emergency release knob 21, a rescuer can push the outboard emergency release knob 23 so as to hydraulically operate the emergency spool-release actuator 13, the emergency door-unlock actuator 42 and the emergency door-unlatch actuator 43. Therefore, the rescuer can quickly open the side door 7 and release the stunned seat occupant for rescue.

In other embodiments, the emergency door-unlatch actuator 43 may be eliminated since a rescuer can open the side door 7 by pulling up the outboard door handle.

In other embodiments, the emergency release control 17 may be built into a front side door, a rear side door or a back door.

In another embodiment, the emergency door-release mechanism II may be built into the back door of a hatchback-type automotive vehicle.

What is claimed is:

1. A release system for a seat occupant restrained by a seat-belt in a vehicle, comprising:

a seat-belt retractor having a lock locking said seat-belt retractor when a vehicle body experiences more than a predetermined degree of deceleration;

means for emergency-releasing said seat-belt retractor after said seat-belt retractor has been locked, said seat-belt retractor emergency-releasing means including a hydraulic actuator releasing the lock; and an emergency release control for said seat-belt retractor emergency releasing means, said emergency release control being mounted on the vehicle body and having a hydraulic circuit controlling said seat-belt retractor emergency-releasing means, the hydraulic circuit including a hydraulic cylinder having inboard and outboard ends and an output port connected to an input port of the hydraulic actuator, the inborad manual actuation means including an inboard plunger mounted within the inboard end, and the outboard manual actuation means including an outboard plunger mounted within the outboard end, depression of one of said inboard and outboard plungers generating hydraulic pressure transmitted to the hydraulic actuator.

2. A release system as recited in claim 1, wherein said inboard manual actuation means comprises an inboard knob integral with the inboard plunger and projecting into a vehicular passenger compartment.

3. A release system as recited in claim 1, wherein said inboard manual actuation means comprises a finish surrounding the inboard knob.

4. A release system as recited in claim 1, wherein said outboard manual actuation means comprises an outboard knob integral with the outboard plunger and projecting outward from a vehicular passenger compartment.

5. A release system as recited in claim 4, wherein said outboard manual actuation means comprises a finish surrounding the outboard knob.

6. A release system as recited in claim 1, wherein said emergency release control is built into a center pillar of the vehicle body.

7. A release system as recited in claim 1, further comprising: means, controlled by said emergency release control, for emergency-unlocking a vehicle door.

8. A release system as recited in claim 7, wherein said vehicle door emergency-unlocking means comprises a hydraulic emergency door-unlock actuator.

9. A release system for a seat occupant restrained by a seat-belt in a vehicle, comprising:

a seat-belt retractor having a lock locking said seat-belt retractor when a vehicle body experiences more than a predetermined degree of deceleration;

means for emergency-releasing said seat-belt retractor after said seat-belt retractor has been locked, said seat-belt retractor emergency-releasing means including a hydraulic actuator releasing the lock;

an emergency release control, mounted on the vehicle body, for said seat-belt retractor emergency-releasing means, said emergency release control having inboard and outboard manual actuation means; and means, controlled by said emergency release control, for emergency-unlocking a vehicle door, said vehicle door emergency-unlocking means including a hydraulic emergency door-unlock actuator; and wherein said emergency release control has a first hydraulic circuit controlling the hydraulic actuator, a second hydraulic circuit controlling the hydraulic emergency door-unlock actuator, a shock sensor providing a signal indicating that the vehicle body is experiencing more than the predetermined degree of deceleration, and a solenoid control valve continuously holding the first hydraulic circuit closed and disconnecting the second hydraulic circuit from the first hydraulic circuit in the absence of the signal from the shock sensor, the solenoid control valve connecting the second hydraulic circuit to the first hydraulic circuit so as to enable the hydraulic emergency door-unlock actuator when the shock sensor outputs said signal.

10. A release system as recited in claim 9, wherein the shock sensor comprises an electrical switch and a weight swinging due to the effect of its own inertia and actuating the electrical switch to generate the signal when the weight experiences more than the predetermined degree of deceleration.

11. A release system as recited in claim 9, further comprising: means, controlled by said emergency release control, for emergency-unlatching the door.

12. A release system as recited in claim 11, wherein said door emergency-unlatching means comprises a hydraulic emergency door-unlatch actuator.

13. A release system for a seat occupant restrained by a seat-belt in a vehicle, comprising:

a seat-belt retractor having a lock locking said seat-belt retractor when a vehicle body experiences more than a predetermined degree of deceleration;

means for emergency-releasing said seat-belt retractor after said seat-belt retractor has been locked, said seat-belt retractor emergency-releasing means including a hydraulic actuator releasing the lock;

an emergency release control, mounted on the vehicle body, for said seat-belt retractor emergency-releasing means, said emergency release control having inboard manual actuation means; and means, controlled by said emergency release control, for emergency-unlocking a vehicle door, said vehicle door emergency-unlocking means including a hydraulic emergency door-unlock actuator; and wherein said emergency release control has a first hydraulic circuit controlling the hydraulic actuator, a second hydraulic circuit controlling the hydraulic emergency door-unlock actuator, a shock sensor providing a signal indicating that the vehicle body is experiencing more than the predetermined degree of deceleration, and a solenoid control valve continuously holding the first hydraulic circuit closed and disconnecting the second hydraulic circuit from the first hydraulic circuit in the absence of the signal from the shock sensor, the solenoid control valve connecting the second hydraulic circuit to the first hydraulic circuit so as to enable the hydraulic emergency door-unlock actuator when the shock sensor outputs said signal.

14. A release system for a seat occupant restrained by a seat-belt in a vehicle, comprising:

a seat-belt retractor having a lock locking said seat-belt retractor when a vehicle body experiences more than a predetermined degree of deceleration;

means for emergency-releasing said seat-belt retractor after said seat-belt retractor has been locked, said seat-belt retractor emergency-releasing means including a hydraulic actuator releasing the lock;

an emergency release control, mounted on the vehicle body, for said seat-belt retractor emergency-releasing means, said emergency release control having outboard manual actuation means; and means, controlled by said emergency release control, for emergency-unlocking a vehicle door, said vehicle door emergency-unlocking means including a hydraulic emergency door-unlock actuator; and wherein said emergency release control has a first hydraulic circuit controlling the hydraulic actuator, a second hydraulic circuit controlling the hydraulic emergency door-unlock actuator, a shock sensor providing a signal indicating that the vehicle body is experiencing more than the predetermined degree of deceleration, and a solenoid control valve continuously holding the first hydraulic circuit closed and disconnecting the second hydraulic circuit from the first hydraulic circuit in the absence of the signal from the shock sensor, the solenoid control valve connecting the second hydraulic circuit to the first hydraulic circuit so as to enable the hydraulic emergency door-unlock actuator when the shock sensor outputs said signal.

* * * * *